United States Patent [19]
Baker, III et al.

[11] Patent Number: 6,092,911
[45] Date of Patent: Jul. 25, 2000

[54] APPARATUS AND METHOD FOR ILLUMINATING THE SCENE OF AN EMERGENCY

[75] Inventors: Harry R. Baker, III, Wood-Ridge, N.J.; Francis M. Brick, Worcester, Pa.

[73] Assignee: F. M. Brick Industries, Inc., Warminster, Pa.

[21] Appl. No.: 09/166,555

[22] Filed: Oct. 5, 1998

[51] Int. Cl.[7] ............................. F21V 33/00; A62C 27/00
[52] U.S. Cl. .................... 362/253; 362/485; 362/543; 169/24; 169/25
[58] Field of Search ...................................... 362/485, 486, 362/542, 543, 249, 253, 192; 169/24, 25

[56] References Cited

U.S. PATENT DOCUMENTS

| | | |
|---|---|---|
| 3,847,246 | 11/1974 | Banner . |
| 3,860,092 | 1/1975 | Holmes . |
| 4,181,929 | 1/1980 | Barber et al. ............................ 362/192 |
| 4,235,306 | 11/1980 | Ross et al. . |
| 4,311,208 | 1/1982 | Macrorie et al. . |
| 4,428,033 | 1/1984 | McBride . |
| 4,766,525 | 8/1988 | Loughlin . |
| 5,051,874 | 9/1991 | Guss . |
| 5,157,591 | 10/1992 | Chudzik . |
| 5,297,652 | 3/1994 | Armond et al. . |
| 5,467,827 | 11/1995 | Mcloughlin ............................... 169/24 |
| 5,573,300 | 11/1996 | Simmons . |

*Primary Examiner*—Cassandra Spyrou
*Assistant Examiner*—Fayez Assaf
*Attorney, Agent, or Firm*—William H. Eilberg

[57] ABSTRACT

An emergency vehicle includes an extendable ladder and a compartment for storing a kit containing a source of light and a cable. When the vehicle arrives at the scene of an emergency, the ladder is partially extended, and the kit is removed from the compartment. The source of light is then suspended from the ladder, near the distal end of the ladder, and the cable is connected between the source of light and a source of power. The ladder is then extended and elevated. The method provides light in hard-to-reach places, regardless of whether the accident scene already is lighted. The kit preferably includes cable support hangers which aid in suspending the cable along the length of the ladder. When the emergency work is complete, the components of the kit may be removed and stored in the vehicle. In another embodiment, the kit includes a unitary frame which holds a generator and a plurality of lamps. The kit does not interfere with the operation of the vehicle, and substantially extends its capability.

18 Claims, 4 Drawing Sheets

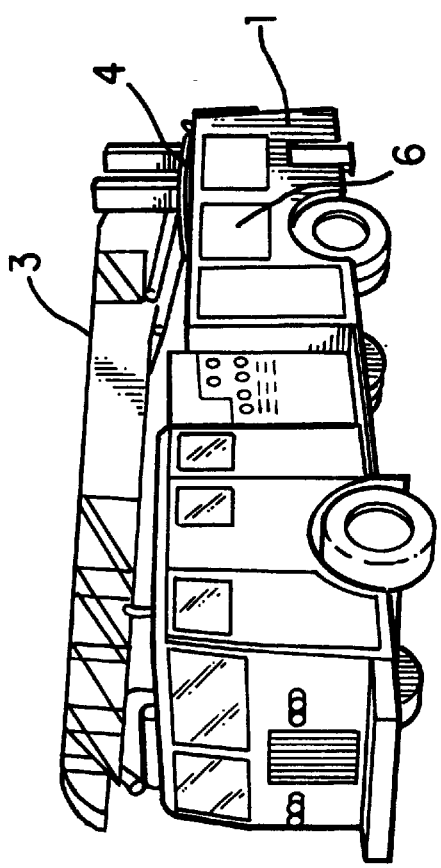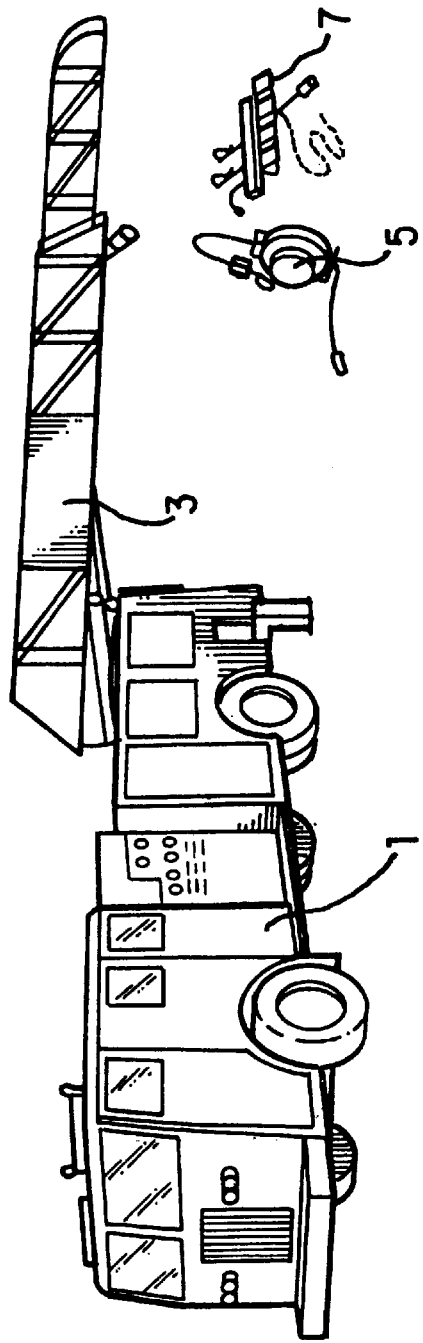

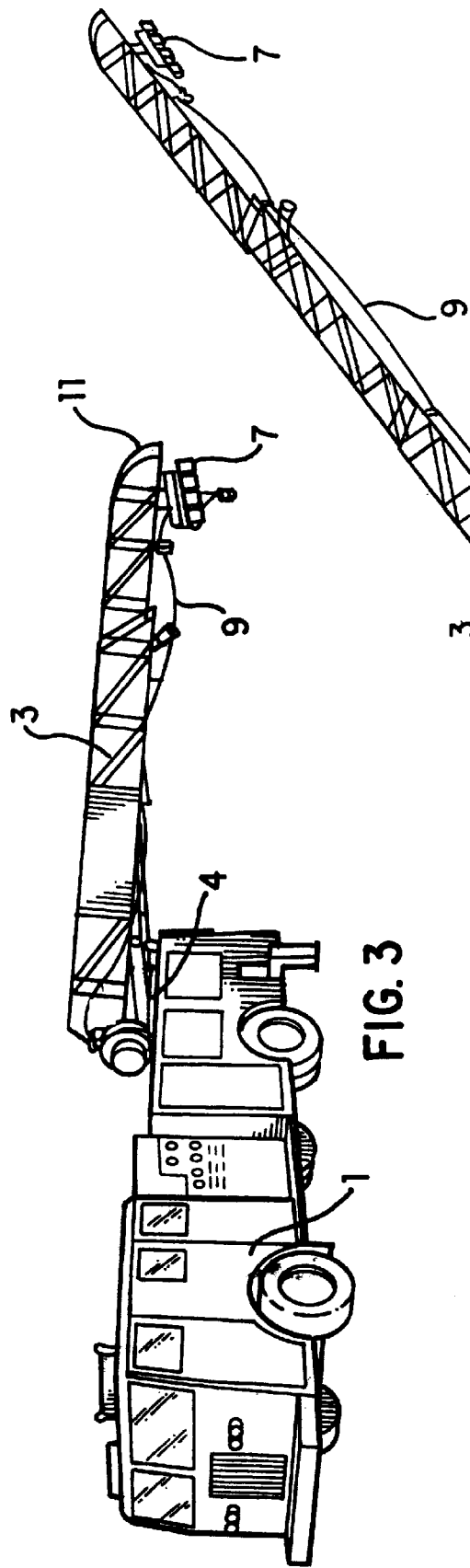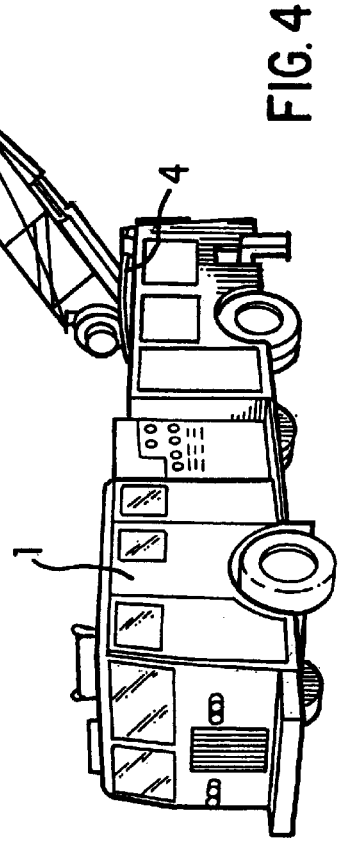
FIG. 3
FIG. 4

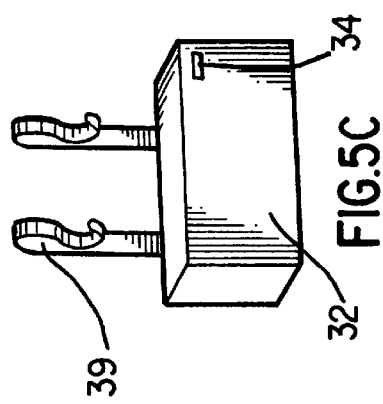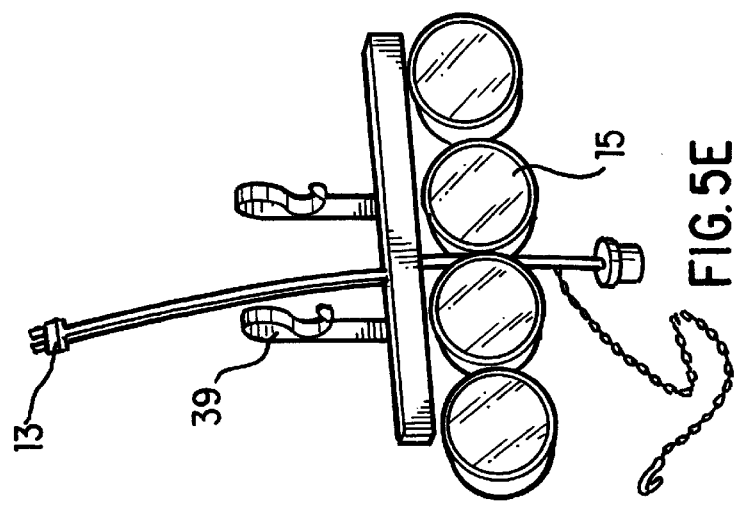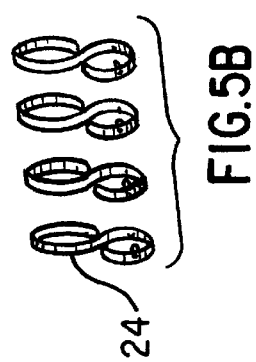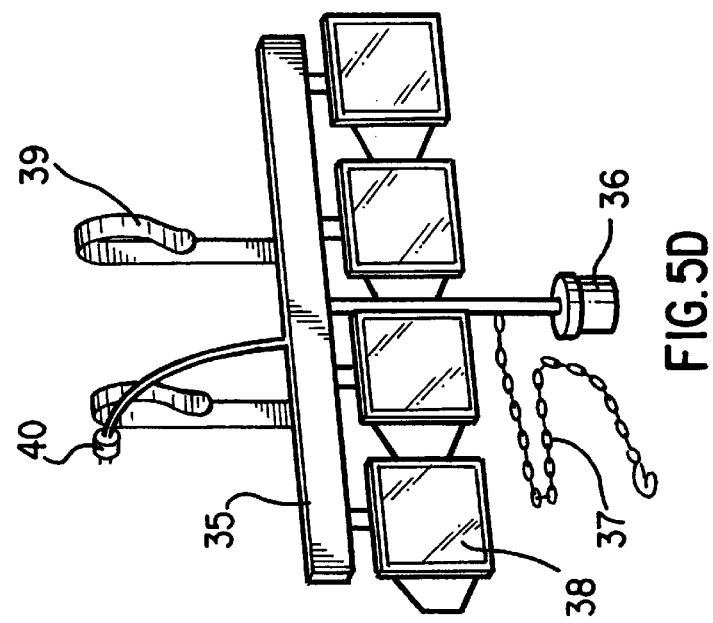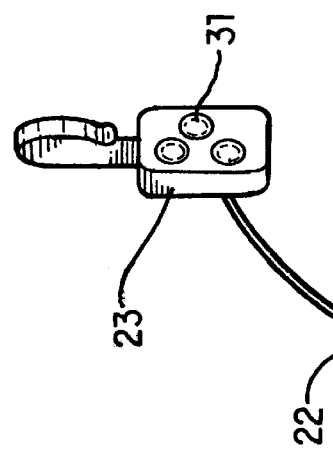

APPARATUS AND METHOD FOR ILLUMINATING THE SCENE OF AN EMERGENCY

BACKGROUND OF THE INVENTION

This invention relates to the field of rescue equipment, such as fire trucks and the like, and provides a method and apparatus for providing lighting at the scene of an emergency.

Emergencies such as automobile accidents, fires, train wrecks, building collapses, and other catastrophes, often occur at night, and in locations far removed from street lamps or other sources of artificial lighting. Rescue personnel clearly need adequate lighting to perform their jobs effectively and rapidly, as is necessary in an emergency. The headlights of a conventional fire truck, or of a conventional police car, are often insufficient to supply such lighting. In many cases, such as a fire on an upper floor of a multi-story building, or automobile wreckage located a distance from a main highway, the critical area is far beyond the range of conventional vehicle headlights or hand-held lights. Moreover, even if an accident scene were within range, the headlights of a vehicle, or a portable light, could not illuminate the scene from above.

Various emergency lighting devices have been used, including lights disposed at the end of hand-held poles. Such lights provide illumination beyond the range of the headlights of most emergency vehicles, but they are still unsatisfactory in most cases. Among other problems, manipulation of light towers is often unwieldy, ineffective, and/or beyond the range of the tower, in attempting to provide overhead lighting.

The present invention solves the above-described problem by providing an apparatus and method for illuminating an accident scene. The invention enables an ordinary fire truck, or other conventional emergency vehicle having an extendable ladder, to provide the necessary illumination, without requiring substantial modification of the vehicle, and without interfering with the operation of the vehicle.

SUMMARY OF THE INVENTION

The method of the present invention comprises the following basic steps. First, one drives an emergency vehicle, such as a fire truck having an extendable ladder, to the scene of an emergency. The emergency vehicle carries, in its storage compartments, a source of light, a source of power, and a cable to connect the source of light to the source of power. At the scene of the emergency, one attaches the source of light to the ladder, at or near its distal end, and one connects the cable between the source of light and the source of power. One may also attach cable supports along the length of the ladder, to prevent the cable from interfering with the operation of the ladder. Finally, one extends and elevates the ladder, so that the source of light is positioned to illuminate the emergency scene from the desired position.

The source of light is preferably a light bar which includes several lamps. The light bar preferably includes one or more hanging straps, the light bar being suspended from one of the structural members of the ladder by means of such straps. The light bar may also include a chain which can be used to adjust the position of the light bar, and to hold the light bar in a desired orientation relative to the ladder.

When the emergency work is completed, the above-described steps can be easily reversed, and the equipment stored again in a compartment of the vehicle. The practice of the above-described method therefore does not interfere with the operation of the vehicle.

The apparatus of the invention includes the emergency vehicle, having the extendable ladder, and a kit comprising a plurality of items relating to the providing of light. These items preferably include a light bar having a plurality of lamps, a battery box, and a cable for connecting the light head to the battery box. In addition to the above-mentioned items, the kit may also include a plurality of cable supports, for supporting the cable as it extends from the distal end of the ladder to the vicinity of the vehicle. The kit may also include a junction box, to simplify the connection of the various components. It is also possible for the kit to include more than one kind of light bar, to provide lamps of different types and wattages.

In another embodiment, the kit includes a unit which comprises both a set of lights and a generator, both mounted on a single frame, the frame having straps for suspending the frame from the ladder.

The invention therefore has the primary object of providing a method and apparatus for temporary, portable illumination at the scene of an emergency.

The invention has the further object of providing light in difficult-to-reach places, at the scene of an emergency.

The invention has the further object of substantially extending the illumination capacity, and the effective range of illumination, of conventional emergency vehicles, without requiring modification of such vehicles.

The invention has the further object of providing a kit which can be easily carried by an emergency vehicle, wherein the kit includes various components necessary for practicing the method described above.

The invention has the further object of providing the kit as described above, wherein the kit does not interfere with the operation of the emergency vehicle.

The reader skilled in the art will recognize other objects and advantages of the present invention, from a reading of the brief description of the drawings, the detailed description of the invention, and the appended claims.

BRIEF DESCRIPTION OF THE DRAWINGS

FIG. 1 provides a perspective view of an emergency vehicle equipped for practicing the method of the present invention, and representing the first step in the method.

FIG. 2 provides a perspective view showing the emergency vehicle with its ladder pivoted outwardly, and showing elements of the kit of the present invention, before they have been affixed to the ladder.

FIG. 3 provides a perspective view showing the emergency vehicle after the source of light has been attached.

FIG. 4 provides a perspective view showing the next step in the method of the present invention, namely the extension of the ladder with the source of light mounted at its distal end.

FIGS. 5a–5g provide perspective views of the various elements of the kit that is carried in the emergency vehicle of the present invention.

DETAILED DESCRIPTION OF THE INVENTION

Figure 5F:
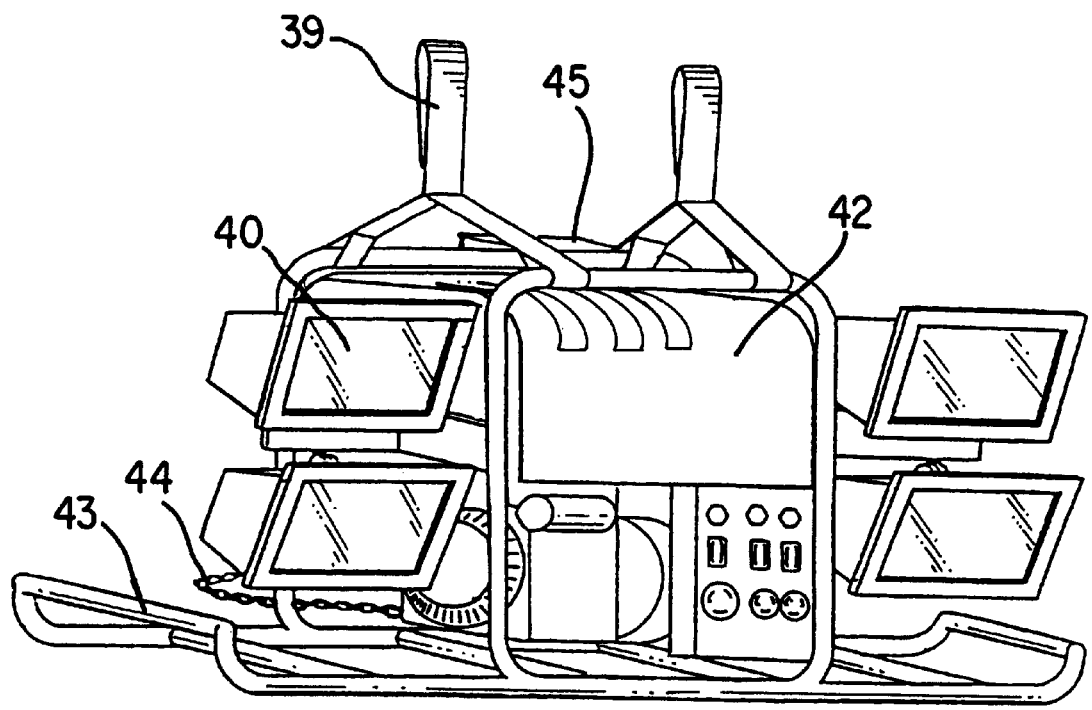

FIG. 1 shows an emergency vehicle, such as a fire truck, for use in the present invention. Vehicle 1 has extendable and pivotable ladder 3 attached. The ladder is supported by turntable 4, the turntable being part of the vehicle. Rotation of the turntable therefore causes the ladder to pivot. The vehicle includes one or more compartments, such as the compartment indicated by reference numeral 6, which can be used to store and transport supplies, including the kit to be described below. Note that the only difference between the vehicle shown in FIG. 1, and those of the prior art, is that the vehicle of FIG. 1 carries the kit to be described below.

FIG. 2 shows emergency vehicle 1 with ladder 3 pivoted horizontally so that the ladder points away from the vehicle. FIG. 2 also shows two major items from the kit, namely cable reel and junction box assembly 5 and light bar 7. Assembly 5 and light bar 7, which were previously stored within one or more of the compartments of the vehicle, are shown after having been removed from the vehicle, and before affixation to the ladder.

FIG. 3 shows the vehicle 1 after the light bar 7 has been affixed to the ladder 3, in the vicinity of its distal end 11. Cable 9, which was previously coiled as part of assembly 5 of FIG. 2, has been connected between the light bar and a power source (not shown) located in the vehicle. The cable is preferably attached to the ladder at various points along the length of the ladder. The cable reel can be positioned on or near the turntable, so that the cable is paid out as the ladder is extended. Alternatively, one could attach the reel to the outermost segment of the ladder, provided that one still has sufficient cable to connect the junction box to a source of power in the vehicle. In still another alternative, one could provide a power source, such as a battery box, in the immediate vicinity of the light bar. In another alternative, the power source is a generator, and the generator may be mounted on the same assembly which supports the lights, as will be described below. All such alternatives are within the scope of the invention.

FIG. 4 shows the vehicle with the ladder extended and elevated. When the ladder is extended, the light bar remains in position at or near the distal end of the ladder, and the cable is unwound from the reel as needed. The plug of the light bar is inserted into the junction box that is connected to the cable, the junction box also being located in the immediate vicinity of the distal end of the ladder.

In general, the ladders provided with emergency vehicles, such as the one shown in the figures, have many structural elements from which a light bar may be suspended. Thus, it is easy to find many suitable locations on the ladder from which to suspend the light bar. The light bar need not be at the very end of the ladder, but it is preferable that the light bar at least be located near the distal end, to obtain the maximum benefit when the ladder is fully extended.

FIGS. 5a–5g show the various components that may be included in the kit that is carried by the emergency vehicle, for use in practicing the present invention. FIG. 5a shows cable reel 21 which holds electric cable 22. The cable reel may be designed to be rewound manually, or it may include spring means or electric means (not shown) for assisting in rewinding. The cable is connected to junction box 23, which preferably has locking female electric receptacles 31. The locking receptacles prevent the electric plug from disengaging, and turning off the light, while the rescue work is in progress.

FIG. 5b shows a plurality of cable support hangers 24, which can be used to attach various portions of the cable to the ladder.

FIG. 5c shows a battery power box 32, which provides DC power. The battery box includes locking female receptacle 34, and preferably also includes an on-off switch (not shown).

FIG. 5d shows a light bar 35, which contains a plurality of flood lamps 38. The type and wattage of these lamps can be varied, preferably in the range of about 500–1500 watts. Locking electric plug 40 is designed for secure attachment to the junction box. Hanging straps 39, which may be made of metal or webbing, facilitate the rapid suspension of the light bar from the a structural element of the ladder. The light bar could be attached to the ladder in various ways, such as by suspending it from a rung, or by suspending it from some other structural element of the ladder. Safety chain 37 facilitates adjustment of the angle of orientation of the light bar, thereby assuring that the lamps can be aimed at the desired location. By attaching the chain to the ladder structure, one can hold the light bar in a desired position. The light bar may also include flashing emergency light 36.

FIG. 5e shows another light bar, similar to that of FIG. 5d, except that the lamps are spot lamps instead of flood lamps. Flood lamps will illuminate a very wide area between the lamp and the object being illuminating. Spot lamps illuminate a particular spot when properly aimed. Both light bars could be used on the same ladder, simply by suspending the light bars from different rungs. Thus, in the preferred embodiment, the two light bars of FIG. 5d and FIG. 5e are both included in the kit contained within the vehicle, so that the user can choose either or both.

Figure 5G:
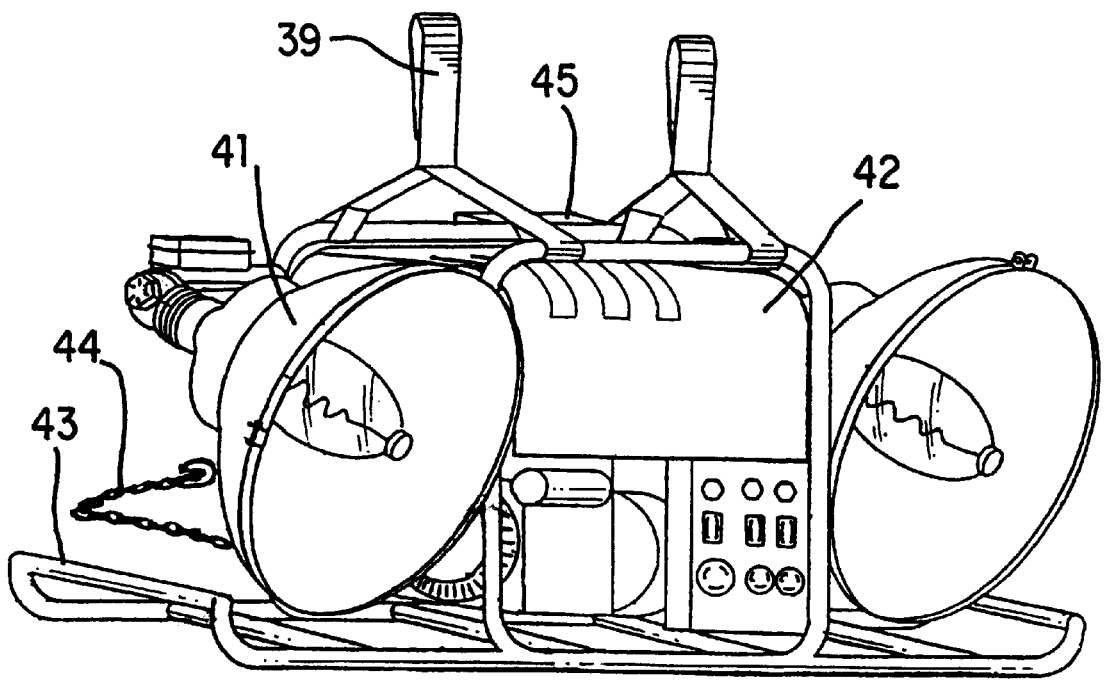

FIGS. 5f and 5g show embodiments wherein the lights and the power source are mounted on the same frame, to define a single module which can be suspended from a ladder. These embodiments have the advantage of eliminating the large power transmission cable which would be needed to connect two or more large lights to their power sources. These embodiments are otherwise equivalent to the preceding embodiments, and can be constructed to have virtually any number of lights of virtually any size.

In FIGS. 5f and 5g, similar reference numerals denote identical elements. The only component having a different reference numeral, in these two figures, is the light, which is designated by reference numeral 40 in FIG. 5f and by reference numeral 41 in FIG. 5g. The only difference between the figures is in the type and number of lamps.

In both FIGS. 5f and 5g, support cage or frame 43 supports a plurality of lights (40 or 41) and generator 42. Attachment straps 39 connect to the frame, and enable easy suspension of the frame from the ladder. The wiring would be directly to the lamps, via control box 45, which in turn is connected to the generator. Chain 44 is similar to the safety chain described earlier, and assures correct alignment of the suspended light assembly.

FIGS. 1–4, when considered in sequence, therefore illustrate the steps of the method of the present invention. In FIG. 1, the emergency vehicle is driven to the site of the emergency. It is assumed that the kit described above is contained in one of the compartments of the vehicle, or in an accompanying vehicle. In FIG. 2, the ladder of the vehicle has been pivoted but not yet extended or elevated. The major elements of the kit, namely the light bar and the cable reel, have been removed from the vehicle. The ladder has been rotated, with its most distant section extended, the ladder having been lowered somewhat to facilitate attachment of the light bar. In FIG. 3, the light bar has been suspended from the end of the ladder, and the cable has been connected between the light bar and a power source. In FIG. 4, the ladder has been extended and elevated, to position the light bar as desired. The length of the ladder may vary, according to the equipment present on the emergency vehicle. Typical ladders of this kind range in length from about 50 feet to over 150 feet when fully extended.

The arrangement of the power source can be modified. Instead of a battery, one may use a generator as a power source. As described above, the generator may be provided on the same frame as the lighting assembly. Alternatively, the generator may be provided as a component of the emergency vehicle. In another alternative, a portable electric generator may be included as a part of the kit, but without being attached to the lighting assembly.

When the emergency work has been completed, the process can be reversed. The ladder is withdrawn, and the light bar(s) disconnected from the power source, or, in the case of the embodiment of FIGS. 5f or 5g, the generator is switched off. The light bar(s), and all other elements of the kit that were used in the process, are removed from the ladder and stored.

The kit therefore does not interfere with the use of the emergency vehicle. The kit merely occupies a relatively small amount of space in one or more compartments of the vehicle. Other than the fact that the kit is stored in or on the vehicle, the vehicle need not be modified to be used in the present invention.

The invention can be further modified in various ways. Different elements can be used in the kit. Varying means of attaching the cable to the ladder could be used. The emergency vehicle need not be a fire truck, but could be any other vehicle equipped with a movable ladder. The type and wattage of the lamps used can be varied. These and other modifications, which will be apparent to those skilled in the art, should be considered within the spirit and scope of the following claims.

What is claimed is:

1. A method of providing light at a scene of an emergency, the method comprising the steps of:
   a) driving an emergency vehicle to a scene of an emergency, the vehicle having an extendable ladder, the ladder having a distal end, wherein the emergency vehicle carries a source of light,
   b) attaching the source of light to the ladder, in a vicinity of the distal end, and
   c) extending and elevating the ladder, so that the source of light becomes positioned to illuminate the emergency scene,
      wherein the source of light is mounted on a light bar having at least one hanging strap, and wherein step (b) comprises suspending said strap from a structural element of the ladder,
      wherein the light bar includes a safety chain, and wherein the method includes the step of manipulating the safety chain to adjust a position of the light bar, so as to illuminate a desired feature.

2. The method of claim 1, wherein the source of light is located on a module containing a source of power, the source of light and source of power being mounted on a frame having an attachment strap, wherein step (b) comprises suspending the module from the ladder by hanging said strap from a structural element of the ladder.

3. The method of claim 1, further comprising the step of suspending a second light bar from another structural element of the ladder.

4. The method of claim 1, further comprising the steps of removing the source of light and the cable from the ladder when emergency work is completed, and storing the source of light and the cable in the vehicle.

5. A method of providing light at a scene of an emergency, the method comprising the steps of:
   a) storing a kit in an emergency vehicle, the kit comprising at least a source of light and a source of power, the vehicle supporting a ladder which is pivotable, extendable, and capable of being elevated,
   b) driving the emergency vehicle, together with the kit, to a scene of an emergency,
   c) removing at least the source of light from the vehicle,
   d) attaching the source of light to the ladder,
   e) connecting the source of light to the source of power, and
   f) extending and elevating the ladder,
      wherein the source of light is mounted on a light bar having at least one hanging strap, and wherein step (b) comprises suspending said strap from a structural element of the ladder,
      wherein the light bar includes a safety chain, and wherein the method includes the step of manipulating the safety chain to adjust a position of the light bar, so as to illuminate a desired feature.

6. The method of claim 5, wherein the ladder has a distal end, and wherein step (d) comprises attaching the source of light to the ladder in a vicinity of the distal end of the ladder.

7. The method of claim 5, further comprising the step of attaching cable support hangers to the ladder, and arranging a cable to be supported by the cable support hangers.

8. The method of claim 7, further comprising the steps of removing the source of light from the ladder when emergency work is completed, and returning the source of light and the cable to the vehicle.

9. The method of claim 5, wherein the source of light is provided as part of a module, the module including a frame which supports the source of light and a source of power, the frame having an attachment strap, wherein step (d) comprises suspending the module from a structural element of the ladder with said attachment strap.

10. Apparatus for providing light at a scene of an emergency, comprising:
    a) an emergency vehicle, the vehicle supporting a ladder which is pivotable, extendable, and capable of being elevated, the emergency vehicle including storage means, and
    b) a kit contained in the storage means, the kit comprising a source of light and a cable for connecting the source of light to a source of power,
       wherein the source of light comprises a light bar having a plurality of lamps, and wherein the light bar includes a safety chain, the chain comprising means for adjusting and securing a position of the light bar after the light bar has been affixed to the ladder.

11. The apparatus of claim 10, wherein the kit also includes a reel for storing and winding and unwinding the cable, and hanger means for supporting the cable from the ladder.

12. The apparatus of claim 10, wherein the kit further comprises a battery box.

13. The apparatus of claim 11, wherein the kit further comprises a junction box, connected to the cable.

14. The apparatus of claim 10, wherein the kit includes at least two distinct sources of light.

15. The apparatus of claim 14, wherein each source of light comprises a light bar having a plurality of lamps.

16. The apparatus of claim 10, wherein the source of light is provided as part of a module, wherein the module includes a frame which supports the source of light and a source of power, the frame having an attachment strap which comprises means for suspending the module from a structural element of the ladder.

17. A method of providing light at a scene of an emergency, the method comprising the steps of:
   a) driving an emergency vehicle to a scene of an emergency, the vehicle having an extendable ladder, the ladder having a distal end, wherein the emergency vehicle carries a source of light,
   b) attaching the source of light to the ladder, in a vicinity of the distal end, and
   c) extending and elevating the ladder, so that the source of light becomes positioned to illuminate the emergency scene,
      wherein the source of light is mounted on a light bar having a safety chain, and wherein the method includes the step of manipulating the safety chain to adjust a position of the light bar, so as to illuminate a desired feature.

18. A method of providing light at a scene of an emergency, the method comprising the steps of:
   a) storing a kit in an emergency vehicle, the kit comprising at least a source of light and a source of power, the vehicle supporting a ladder which is pivotable, extendable, and capable of being elevated,
   b) driving the emergency vehicle, together with the kit, to a scene of an emergency,
   c) removing at least the source of light from the vehicle,
   d) attaching the source of light to the ladder,
   e) connecting the source of light to the source of power, and
   f) extending and elevating the ladder,
      wherein the source of light is mounted on a light bar having a safety chain, and wherein the method includes the step of manipulating the safety chain to adjust a position of the light bar, so as to illuminate a desired feature.

* * * * *